United States Patent [19]

Oikawa et al.

[11] Patent Number: 4,797,466
[45] Date of Patent: Jan. 10, 1989

[54] HIGH-TEMPERATURE ADHESIVE POLYIMIDE FROM 2,6-BIS(3-AMINOPHENOXY)PYRIDINE

[75] Inventors: Hideaki Oikawa; Masahiro Ohta, both of Yokohama; Saburo Kawashima, Yokosuka; Shoji Tamai; Yoshiho Sonobe, both of Yokohama; Akihiro Yamaguchi, Kamakura, all of Japan

[73] Assignee: Mitsui Toatsu Chemicals, Inc., Tokyo, Japan

[21] Appl. No.: 11,907

[22] Filed: Feb. 6, 1987

[30] Foreign Application Priority Data

Feb. 12, 1986 [JP] Japan .................. 61-026936

[51] Int. Cl.$^4$ ............................................. C08G 73/10
[52] U.S. Cl. .................... 528/185; 428/473.5; 528/125; 528/128; 528/186; 528/187; 528/188; 528/228; 528/353
[58] Field of Search ............... 528/185, 186, 187, 188, 528/125, 128, 228, 353

[56] References Cited

U.S. PATENT DOCUMENTS

| | | | |
|---|---|---|---|
| 3,716,549 | 2/1973 | Darsow et al. | 528/185 |
| 4,111,906 | 9/1978 | Jones et al. | 528/229 |
| 4,203,922 | 5/1980 | Jones et al. | 564/315 |
| 4,535,101 | 8/1985 | Lee et al. | 528/185 |

FOREIGN PATENT DOCUMENTS

| | | |
|---|---|---|
| 58-157190 | 9/1983 | Japan . |
| 59-76451 | 5/1984 | Japan . |
| 267893 | 7/1970 | U.S.S.R. . |

Primary Examiner—Harold D. Anderson
Attorney, Agent, or Firm—Fisher, Christen & Sabol

[57] ABSTRACT

This invention relates to a novel polyimide and describes method of its preparation, adhesives of the polyimide and the method for their application.

The polyimide has recurring units of the formula

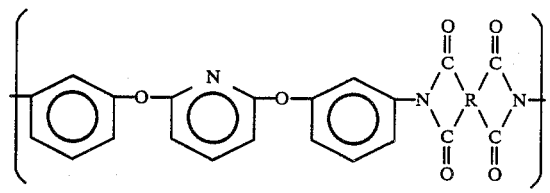

(where R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function).

The polyimide can be prepared by reacting 2,6-bis(3-aminophenoxy)pyridine with tetracarboxylic dianhydride in an organic solvent and imidizing resultant polyamic acid.

Various tetracarboxylic dianhydrides can be used and particularly prefered are pyromellitic dianhydride and 3,3',4,4'-benzophenonetetracarboxylic dianhydride.

6 Claims, 2 Drawing Sheets

HIGH-TEMPERATURE ADHESIVE POLYIMIDE FROM 2,6-BIS(3-AMINOPHENOXY)PYRIDINE

BACKGROUND OF THE INVENTION

This invention relates to a novel polyimide, method for preparing the same and high-temperature adhesive of the same. This invention particularly relates to very excellent adhesives having outstanding adhesive strength and high-temperature stability.

Since the polyimide prepared by reacting tetracarboxylic dianhydride with diamine has been traditionally excellent in various physical properties and thermal stability, it is hereafter expected for a wide use in the field where the high-temperature stability is required.

Although many polyimides developed up to this time have exhibited superior characteristics, they have demonstrated such merits and drawbacks on their properties that prominent high-temperature stability was accompanied by poor processability or the resin being prepared for improving the processability resulted in an inferior high-temperature stability and solvent resistance.

Therefore the object of this invention is to provide a novel polyimide having, in addition to its substantially outstanding high-temperature stability, prominent workability and further having excellent bonding strength and durability at high-temperatures for a long period.

SUMMARY OF THE INVENTION

The inventors have examined hard to achieve the above object. As a result, they have found a novel polyimide and high-temperature adhesives of the same.

The present invention is summarized as follows.

(1) Polyimide having recurring units of the formula:

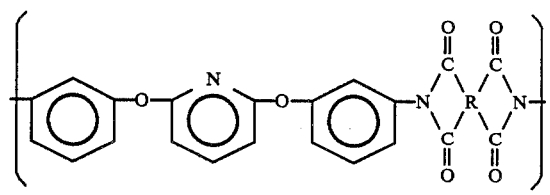

(where R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking functions) wherein polyamic acid precursor of said polyimide has recurring units of the formula:

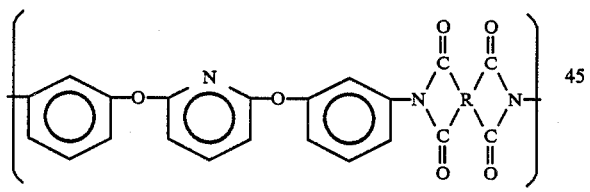

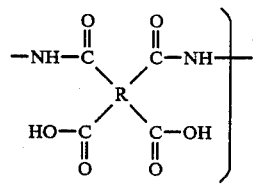

(where R is the same as above) and an inherent viscosity of 0.1 to 3.0 dl/g measured at 35° C. in a solution of 0.5 gram of said polyamic acid per 100 ml of N,N-dimethylacetamide solvent.

(2) A method for preparing polyimide having recurring units of the formula:

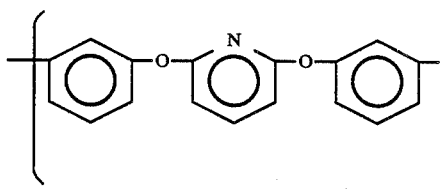

(where R is the same as above) which comprises thermally or chemically imidizing polyamic acid wherein said polyamic acid has recurring units of the formula:

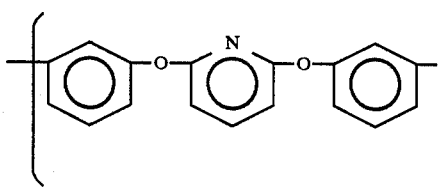

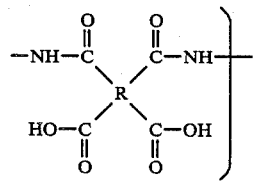

(where R is the same as above) and an inherent viscosity of 0.1 to 3.0 dl/g, and is obtained by reacting 2,6-bis(3-aminophenoxy)pyridine with a tetracarboxylic dianhydride represented by the formula:

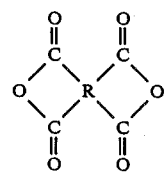

(where R is the same as above) in an organic solvent.

(3) A high-temperature adhesive of polyimide having recurring units of the formula:

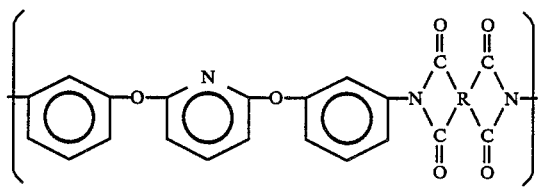

(where R is the same as above) wherein polyamic acid precursor of said polyimide has recurring units of the formula:

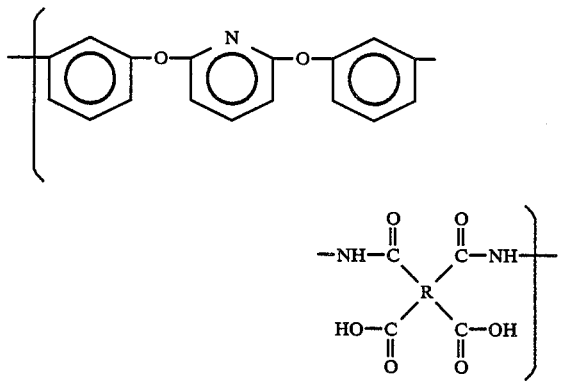

where R is the same as above) and an inherent viscosity of 0.1 to 3.0 dl/g.

(4) A method of adhesion which comprises applying polyimide having recurring units of the formula:

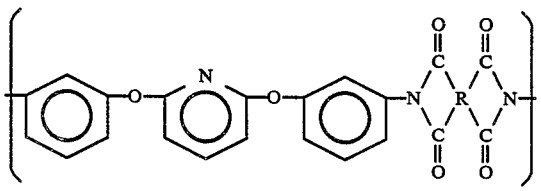

(where R is the same as above) wherein polyamic acid precursor of said polyimide has recurring units of the formula:

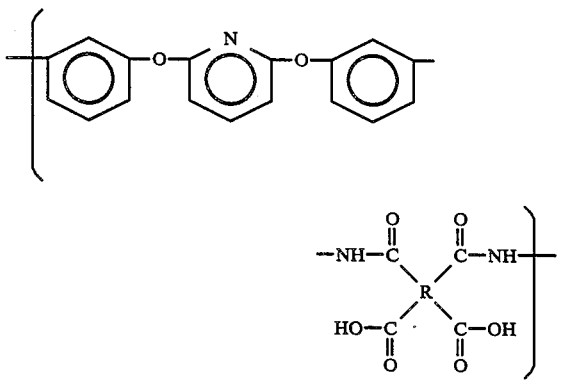

(where R is the same as above) and an inherent viscosity of 0.1 to 3.0 dl/g, on a substrate and further overlapping said substrate with another substrate, followed by heating under pressure above the glass transition temperature of said polyimide.

DETAILED DESCRIPTION OF THE INVENTION

Figure 1:
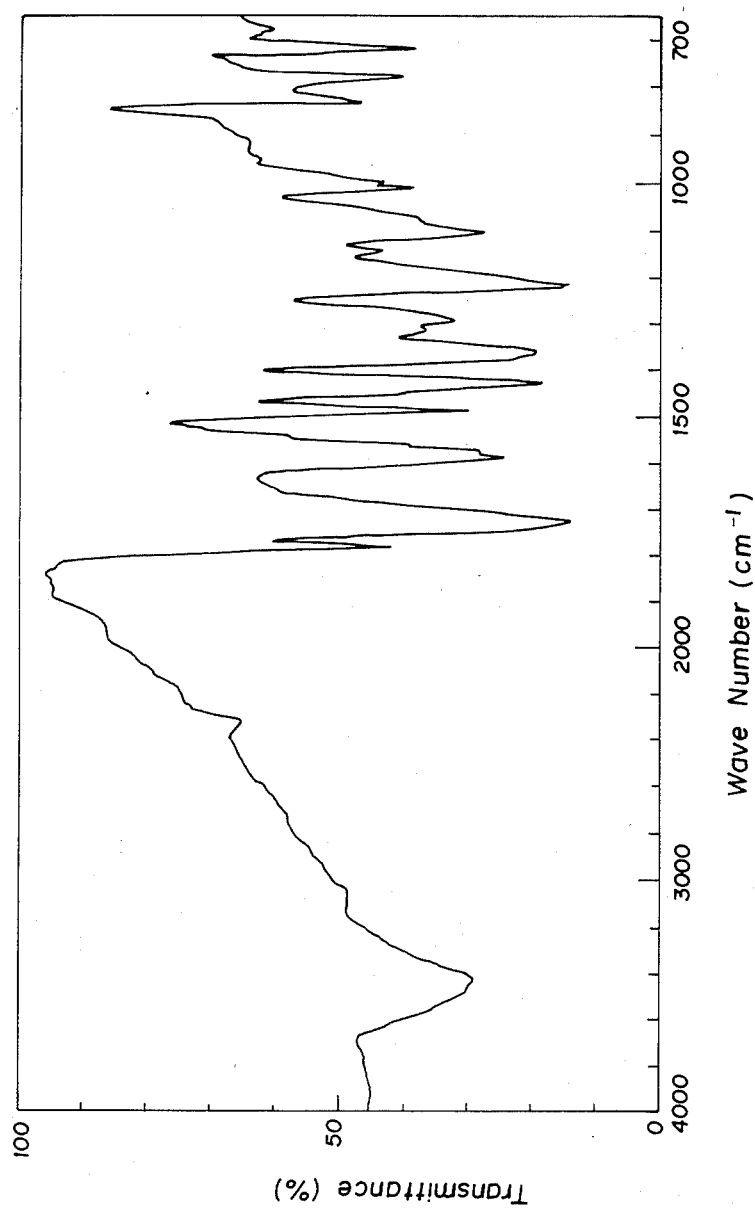
FIGS. 1 and 2 illustrate two typical examples of IR absorption spectrum atlas on the polyimides in this invention.

Polyimide of the present invention is characterized in the use of 2,6-bis(3-aminophenoxy)pyridine as a diamine component and is obtained by conducting dehydrating ring-closure of polyamic acid which is prepared by polymerizing said pyridine derivative with tetracarboxylic dianhydride.

Polyimide of this invention can be derived from diamine having both pyridine ring and aromatic amino radical in a molecule. Polyimide containing the pyridine ring in its polymer chain is a novel one which has not been known up to this time.

Polyimide of this invention has similar high-temperature stability to that of conventional polyimide, and yet has an excellent processability and high-temperature adhesion due to the thermoplastic properties of said polyimide. Besides polyimide of the present invention has pyridine rings in its polymer chain, and thus metal chelates are formed by doping metal ions to exhibit magnetism or electrical conductivity. In addition, polyimide of this invention can be molded to hollow fibers and thin films which are capable of capturing and separating some kind of cations. Furthermore, polyimide of the present invention is also useful as a functional polymer which can be employed as a polymer catalyst in polymerization reactions.

Therefore, polyimide of this invention is a very valuable substance which can be applied for a wide variety of fields such as base materials for space and aeronautics, electric and electronic appliances, high-temperature adhesives, medical polymers and separation membranes.

Polyimide of this invention can be prepared by the following methods.

In the first step, polyamic acid is obtained by polymerizing 2,6-bis(3-aminophenoxy)pyridine with tetracarboxylic dianhydride in the organic solvents.

Tetracarboxylic dianhydride for use in the method of this invention has the formula:

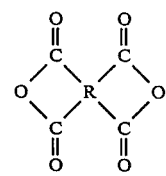

(where R is a tetra-valent radical selected from the group consisting of aliphatic radical having not less than two carbons, cycloaliphatic radical, monoaromatic radical, condensed polyaromatic radical, and non condensed polyaromatic radical wherein aromatic radicals are mutually connected with a bond or a crosslinking function).

Tetracarboxylic dianhydride used in the method includes, for example, ethylene tetracarboxylic dianhydride, cyclopentane tetracarboxylic dianhydride, pyromellitic dianhydride, 3,3',4,4'-benzophenone tetracarboxylic dianhydride, 2,2',3,3'-benzophenone tetracarboxylic dianhydride, 3,3',4,4'-biphenyl tetracarboxylic dianhydride, 2,2',3,3'-biphenyl tetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis-(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalene tetracarboxylic dianhydride, 1,4,5,8-naphthalene tetracarboxylic dianhydride, 1,2,5,6-naphthalene tetracarboxylic dianhydride, 1,2,3,4-benzene tetracarboxylic dianhydride, 3,4,9,10-perylene tetracarboxylic dianhydride, 2,3,6,7-anthracene tetracarboxylic dianhydride and 1,2,7,8-phenanthrene tetracarboxylic dianhydride.

Prefered in particular among these dianhydrides are pyromellitic dianhydride and 3,3',4,4'-benzophenonetetracarboxylic dianhydride.

Tetracarboxylic dianhydride can be used alone or in mixtures of two or more.

The polyamic acid can be normally prepared by reacting ether diamine with tetracarboxylic dianhydride in the organic solvents. The organic solvents used in the reaction include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea and hexamethylphosphoramide. These solvents can be used alone or in mixtures of two or more.

The reaction temperature is normally 60° C. or less, preferably 50° C. or less. The reaction pressure is not restricted in particular and atmospheric pressure is sufficient for carrying out the reaction. The reaction time depends upon the type of solvents, reaction temperature, and raw materials such as tetracarboxylic dianhydrides, and is normally enough to complete the formation of polyamic acid represented by the undermentioned formula. Reaction for 4 to 24 hours is normally sufficient.

Such reaction affords polyamic acid having recurring units of the formula:

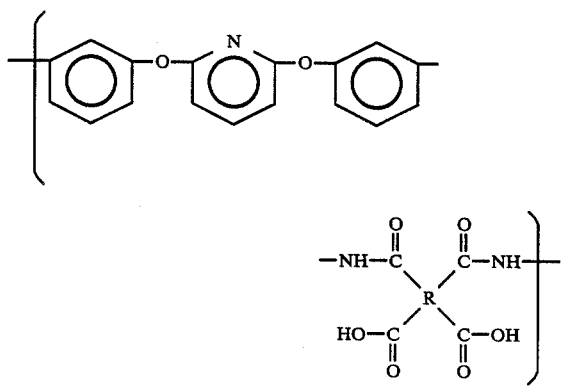

(where R is the same as above).

In the present invention, the polyamic acid precursor of polyimide is required to have an inherent viscosity of 0.1 to 3.0 dl/g, preferably 0.3 to 2.5 dl/g.

In the next step, thermal dehydration of the polyamic acid solution at 100° to 400° C. or chemical dehydration by treating with common imidizing agent such as acetic anhydride afford the corresponding polyimide having recurring units of the formula:

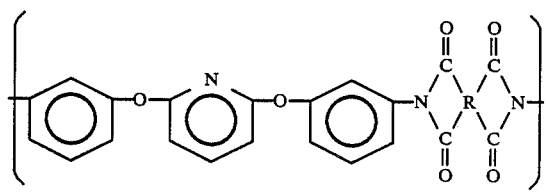

(where R is the same as above).

Polyimide of this invention is employed for adhesives by the following method.

The above polyamic acid is thermally or chemically dehydrated to give, for example, a polyimide film or polyimide powder. The film or powder is inserted between substrates, pressed at 50° to 400° C. under pressure of 1 to 1000 kg/cm² and cured at 100° to 400° C. The substrates can be strongly bonded.

There is no difficulty at all in containing a part of polyamic acid in polyimide.

In another method, the solution of above polyamic acid dissolved in the organic solvent or the reaction mixture as it is, which contains formed polyamic acid in the organic solvent, can be applied as a thin layer on the substrate to be bonded. Then the substrate is preheated for required hours at 180° to 350° C., preferably at approximately 220° C. to remove an excess solvent and to convert polyamic acid into polyimide on the surface of said substrate. The substrate thus obtained is then overlapped with another substrate, pressed at 50° to 400° C. under pressure of 1 to 1,000 kg/cm² and cured at 100° to 400° C. This method is also a preferable one and a firm adhesion of the substrates can be obtained.

EXAMPLES

The present invention will be illustrated with respect to following Synthetic example and Examples.

Synthetic example

A 200 ml flask equipped with a stirrer, nitrogen inlet tube and water separator was charged with 22.4 grams (0.205 mol) of 3-aminophenol, 12.8 grams (0.22 mol) of 96% potassium hydroxide flake, 100 ml of dimethylsulfoxide and 10 ml of toluene. The mixture was heated with stirring under nitrogen atmosphere. Water generated in the reaction mixture was removed by the water separator under refluxing of toluene.

After reducing the internal temperature below 100° C., 14.8 grams (0.10 mol) of 2,6-dichloropyridine was charged, heated again up to the internal temperature of 150° to 160° C. and conducted the reaction for eight hours. After cooling, the resultant mixture was poured into 500 ml of water.

The separated brown mass was filtered, washed with water and dried to afford 28.2 grams (96.2% yield) of 2,6-bis(3-aminophenoxy)pyridine. The crude product was recrystallized twice from isopropyl alcohol to obtain pure white crystals having a melting point of 119°–120° C. Results of elementary analysis and mass spectrum were as follows.

| Elementary analysis ($C_{17}H_{15}N_3O_2$) | | | |
|---|---|---|---|
| | C | H | N |
| Calculated (%) | 69.61 | 5.15 | 14.33 |
| Found (%) | 69.86 | 5.10 | 14.28 |
| Mass spectrum (M/e) | | | |
| M+ 293, 185, 157, 92, 65 | | | |

Example 1

A reaction vessel equipped with a stirrer, reflux condenser and nitrogen inlet tube was charged with 20.53 grams (0.07 mol) of 2,6-bis(3-aminophenoxy)pyridine and 53.09 grams of N,N-dimethylacetmide. Under nitrogen atmosphere 14.95 grams (0.067 mol) of pyromellitic dianhydride were added by portions at room temperature with care to prevent temperature rise of the solution and stirred for 24 hours at room temperature. Polyamic acid thus obtained had an inherent viscosity of 0.72 dl/g, measured at 35° C. in a solution of 0.5 gram of said polyamic acid per 100 ml of N,N-dimethylacetamide solvent.

In the next step, a reaction vessel equipped with a stirrer, reflux condenser and nitrogen inlet tube was charged with 33.3 grams of polyamic acid solution above obtained and 66.7 grams of N,N-dimethylacetamide. Under nitrogen atmosphere, 5.55 grams (0.055 mol) of triethylamine and 8.0 grams (0.078 mol) of acetic anhydride were added dropwise with stirring at room temperature and stirred for 20 hours. After ending the reaction, precipitates were filtered, washed with methanol and dried under reduced pressure at 150° C. for eight hours to afford 9.60 grams (96.0% yield) of yellow polyimide powder.

The polyimide powder had a glass transition temperature of 216° C. in accordance with DSC measurement, a melting point of 395° C. and a five percent weight decrease temperature in air of 508° C. in accordance with DTA-TG.

FIG. 1 illustrates the IR absorption spectrum atlas of polyimide thus obtained. In the spectrum atlas, remarkable absorption is found at 1780 cm$^{-1}$ and 1720 cm$^{-1}$ which are characteristic absorption bands of imide ring and 1240 cm$^{-1}$ which is characteristic absorption band of ether linkage. The melt viscosity of polyimide powder obtained in this Example was measured with a flow tester CFT-500 from Shimadzu Seisakusho. Using the oriffice of 0.1 cm in diameter and 1 cm in length, measurement was performed with a preheat time of five minutes under load of 100 kg at 400° C. The polyimide powder indicated a high flowability and had a melt viscosity of 424 poise and a shear rate of 5775 sec$^{-1}$. The strand obtained was brown, transparent, very flexible and highly elastic.

In addition, the polyimide powder was applied between cold rolled steel panels (JIS G3141, spcc/SD, 25 mm×100 mm×1.6 mm) which were washed with trichloroethylene and preheated at 130° C., and pressed at 320° C. for five minutes under pressure of 20 kg/cm$^2$. The bonded specimen had a lap shear strength of 140 kg/cm$^2$ at room temperature and 82 kg/cm$^2$ at 240° C. in accordance with JIS-K6848 and K6850.

Example 2

A reaction vessel equipped with a stirrer, reflux condenser and nitrogen inlet tube was charged with 20.5 grams (0.07 mol) of 2,6-bis(3-aminophenoxy)pyridine and 131.67 grams of N,N-dimethylacetamide, and added with 21.43 grams (0.067 mol) of 3,3',4,4'-benzophenonetetracarboxylic dianhydride in portions at room temperature under nitrogen atmosphere with care to prevent the temperature rise of the solution. The reaction mixture was further stirred for 24 hours at room temperature.

Polyamic acid thus obtained had an inherent viscosity of 0.44 dl/g.

A part of the polyamic acid solution was casted on a glass plate and heated for one hour each at 100° C., 200° C. and 300° C. to obtain a light-brown transparent film of polyimide having a thickness of 35 microns. The polyimide film had a glass transition temperature of 204° C. in accordance with TMA penetration method and a five percent weight decrease temperature in air of 502° C.

Besides the polyimide film had a tensile strength of 12.4 kg/mm$^2$ and an elongation of 7.5% in accordance with ASTM D-882.

Figure 2:
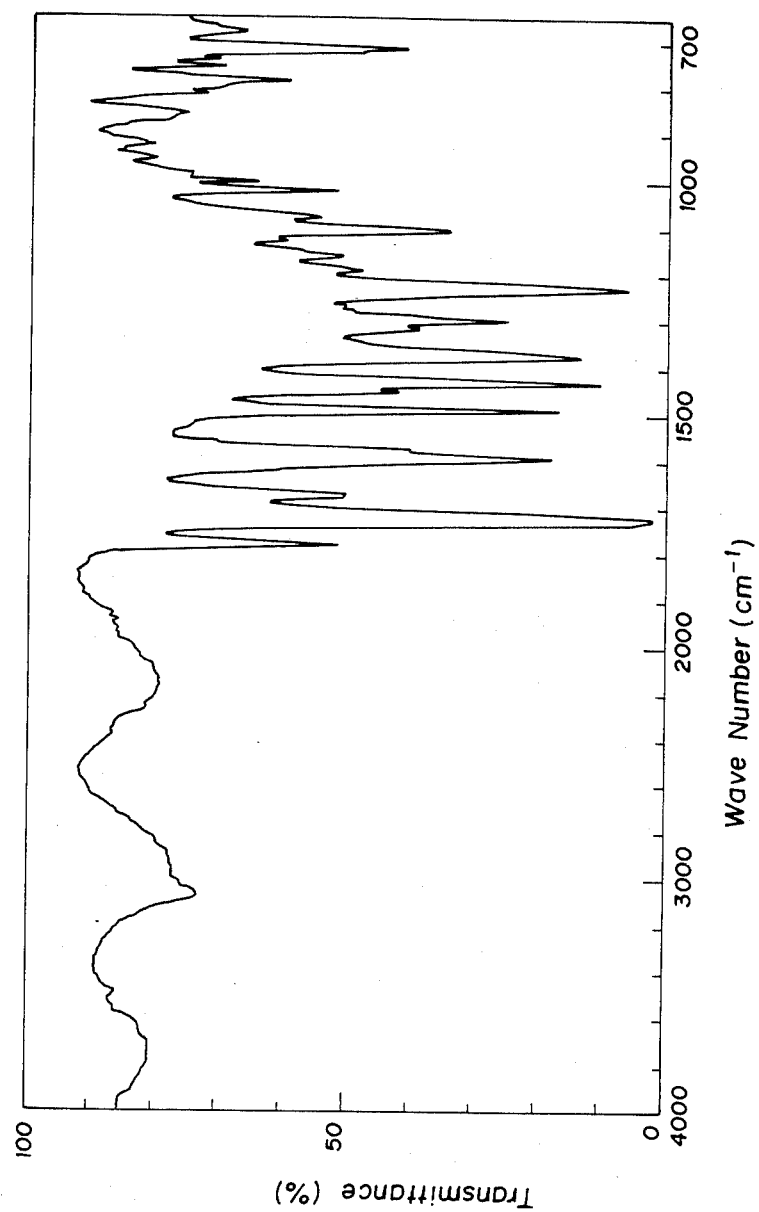

FIG. 2 illustrates IR absorption spectrum of the resultant polyimide film. The spectrum atlas shows remarkable absorption at 1780 cm$^{-1}$ and 1720 cm$^{-1}$ which are characteristic absorption bands of imide ring and at 1240 cm$^{-1}$ which is the characteristic absorption band of ether linkage.

Furthermore, the polyimide film was inserted between cold rolled steel panels which were preheated at 130° C. and pressed for five minutes at 320° C. with the pressure of 20 kg/cm$^2$. The bonded specimen had a lap shear strength of 330 kg/cm$^2$ at room temperature and 190 kg/cm$^2$ at 240° C.

Example 3

The same reaction vessel as Example 1 was charged with 20.53 grams (0.07 mol) of 2,6-bis(3-aminophenoxy)pyridine and 53.09 grams of N,N-dimethylacetamide and added with 14.95 grams (0.067 mol) of pyromellitic dianhydride in parts at room temperature under nitrogen atmosphere with care to prevent the temperature rise of the solution. The reaction mixture was further stirred for 24 hours at room temperature.

Polyamic acid thus obtained had an inherent viscosity of 0.72 dl/g. A part of the polyamic acid solution was casted on a glass plate and treated with the same conditions as Example 2 to obtain a light brown opaque film of polyimide having a thickness of 35 microns.

The polyimide film had a glass transition temperature of 230° C., a melting point of 367° C. and a five percent weight decrease temperature The film also had a tensile strength of 7.0 kg/mm$^2$ and an elongation of 5.0%.

Furthermore, the bonded specimen prepared by treating the polyimide film with the same procedure as Example 2 had a lap shear strength of 120 kg/cm$^2$ at room temperature and 70 kg/cm$^2$ at 240° C.

Example 4

The procedure of Example 3 was repeated except bis(2-methoxyethyl) ether was used as the solvent in place of N,N-dimethylacetamide. The polyamic acid thus obtained had an inherent viscosity of 1.10 dl/g. A part of the polyamic acid was treated with the same procedure as Example 2 to obtain a light brown opaque film of polyimide having a thickness of 35 microns. The polyimide film had a glass transition temperature of 228° C., a melting point of 362° C. and a five percent weight decrease temperature in air of 518° C. Besides the film had a tensile strength of 7.2 kg/mm² and elongation of 4.8%.

Furthermore, the film was inserted between cold rolled steel panels as described in Example 2 and pressed at 320° C. for five minutes under pressure of 20 kg/cm². The bonded specimen had a lap shear strength of 121 kg/cm² at room temperature and 65 kg/cm² at 240° C.

What we claim is:

1. Polyimide consisting of recurring units of the formula:

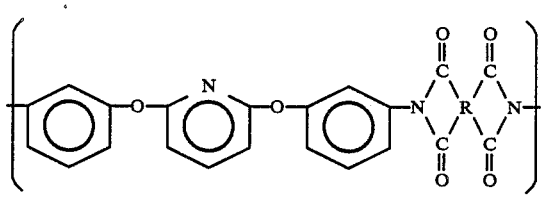

wherein R is a tetra-valent radical selected from the group consisting of an aliphatic radical having not less than two carbons, a cyclo-aliphatic radical, a monoaromatic radical, a condensed polyaromatic radical and a non-condensed polyaromatic radical wherein the aromatic radicals are linked to one another directly or via bridged member, wherein the polyamic acid precursor of said polyimide consists of recurring units of the formula:

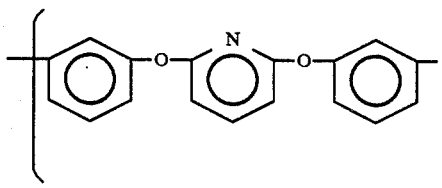

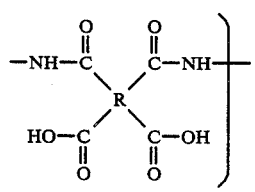

and has an inherent viscosity of 0.1 to 3 0 dl/g measured to 35° C. in a solution of 0.5 gram of said polyamic acid per 100 ml of n,n-dimethylacetamide solvent.

2. The polyimide as claimed in claim 1 wherein R is the tetra-valent radical represented by the formula:

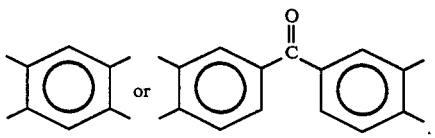

3. A method for preparing polyimide consisting of recurring units of the formula:

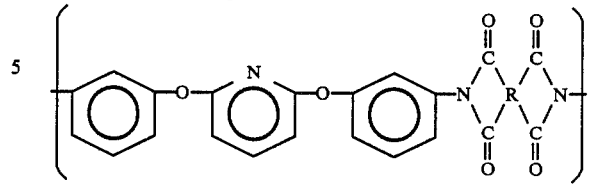

wherein R is a tetra-valent radical selected from the group consisting of an aliphatic radical having not less than two carbons, a cyclo-aliphatic radical, a monoaromatic radical, a condensed polyaromatic radical and a non-condensed polyaromatic radical wherein the aromatic radials are linked to one another directly or via bridged member, which comprises thermally or chemically imidizing polyamic acid wherein said polyamic acid consists of recurring units of the formula:

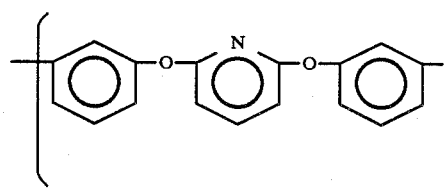

and has an inherent viscosity of 0.1 to 3.0 dl/g measured at 35° C. in a solution of 0.5 gram of said polyamic acid per 100 ml of N,N-dimethylacetamide solvent, and is obtained by reacting 2,6-bis(3-aminophenoxy)pyridine with a tetracarboxylic dianhydride represented by the formula:

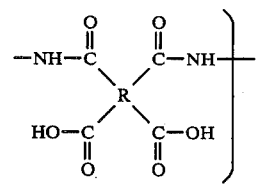

in an organic solvent.

4. The method for preparing polyimide as claimed in claim 3 wherein R is the tetra-valent radical represented by the formula:

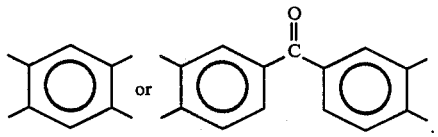

5. A high-temperature resistant adhesive consisting of polyimide which consists of recurring units of the formula:

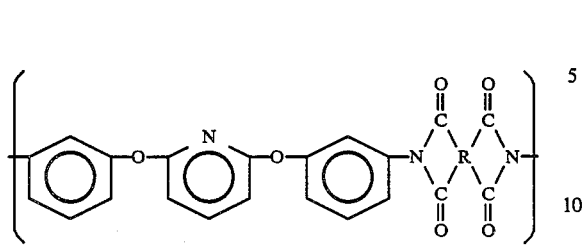

wherein R is a tetra-valent radical selected from the group consisting of an aliphatic radical having not less than two carbons, a cyclo-aliphatic radical, a monoaromatic radical, a condensed polyaromatic radical and a non-condensed polyaromatic radical wherein the aromatic radicals are linked to one another directly or via bridged member, wherein the polyamic acid precursor of said polyimide consists of recurring units of the formula:

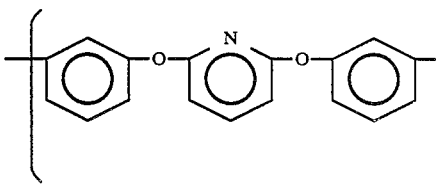

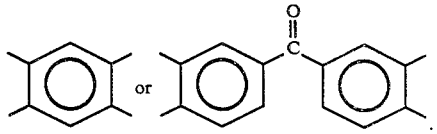

and has an inherent viscosity of 0.1 to 3.0 dl/g measured at 35° C. in a solution of 0.5 gram of said polyamic acid per 100 ml of N,N-dimethylacetamide solvent.

6. The high-temperature adhesive as claimed in claim 5 wherein R is the tetra-valent radical represented by the formula:

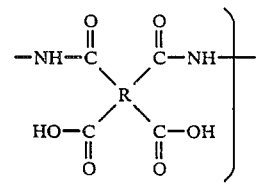

* * * * *